Aug. 11, 1959     E. N. CALHOUN     2,899,529
ELECTRIC HEATING APPARATUS
Filed Oct. 18, 1955     2 Sheets-Sheet 1
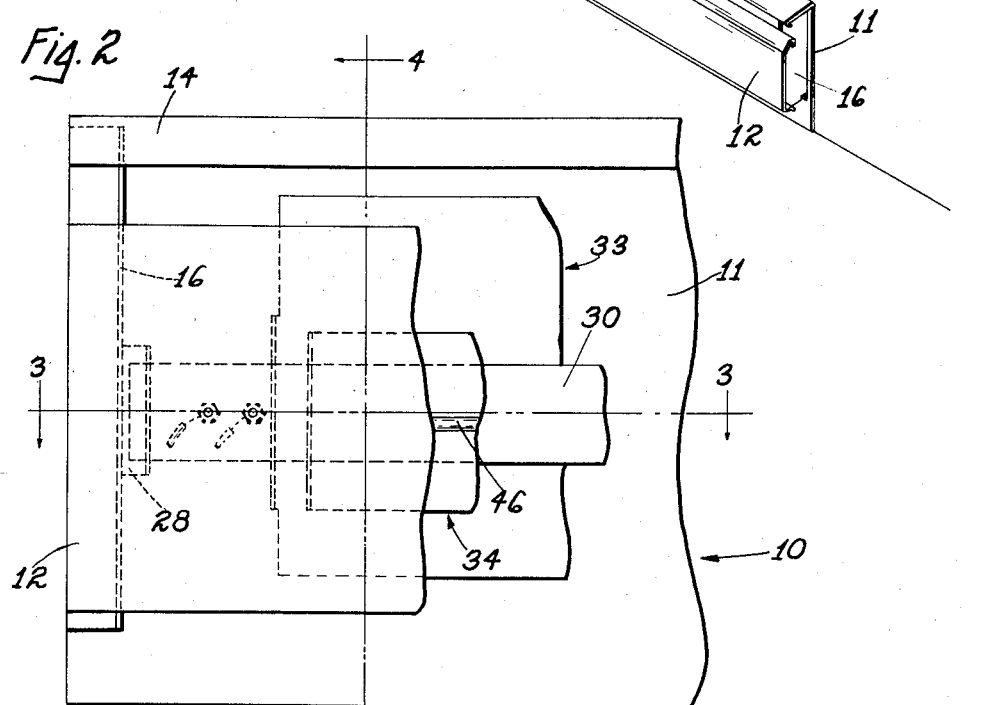
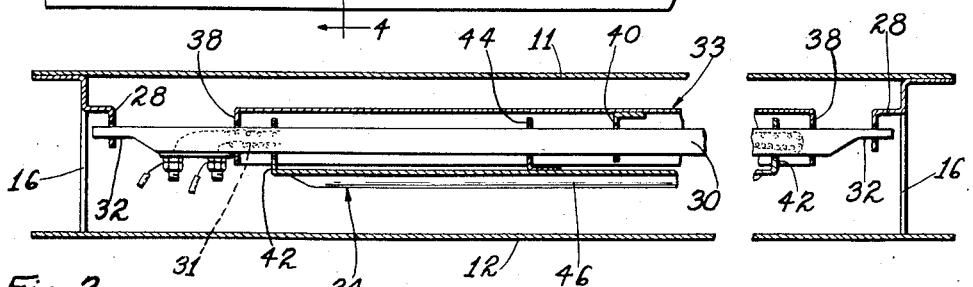
INVENTOR.
ERNEST N. CALHOUN
BY
ATTORNEY Aug. 11, 1959 E. N. CALHOUN 2,899,529
ELECTRIC HEATING APPARATUS
Filed Oct. 18, 1955 2 Sheets-Sheet 2
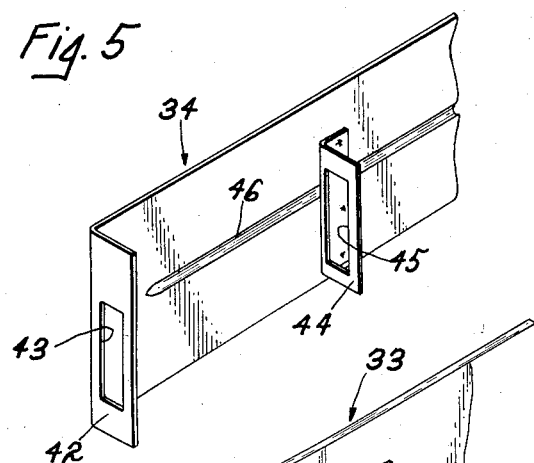
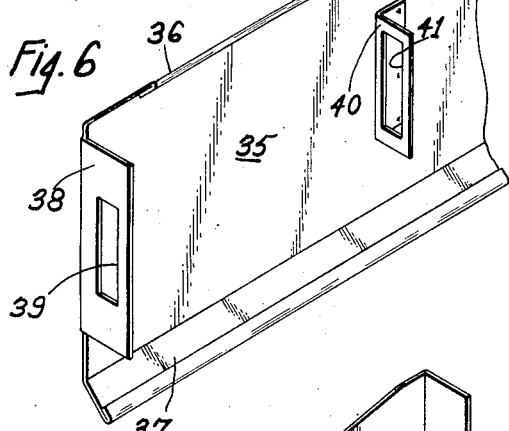
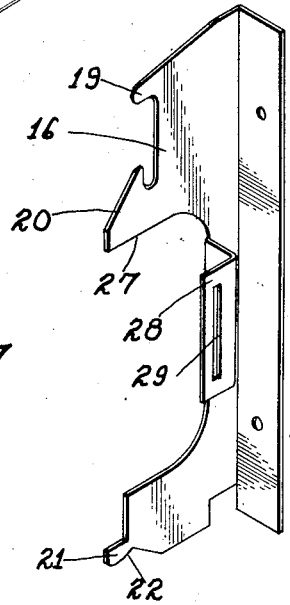
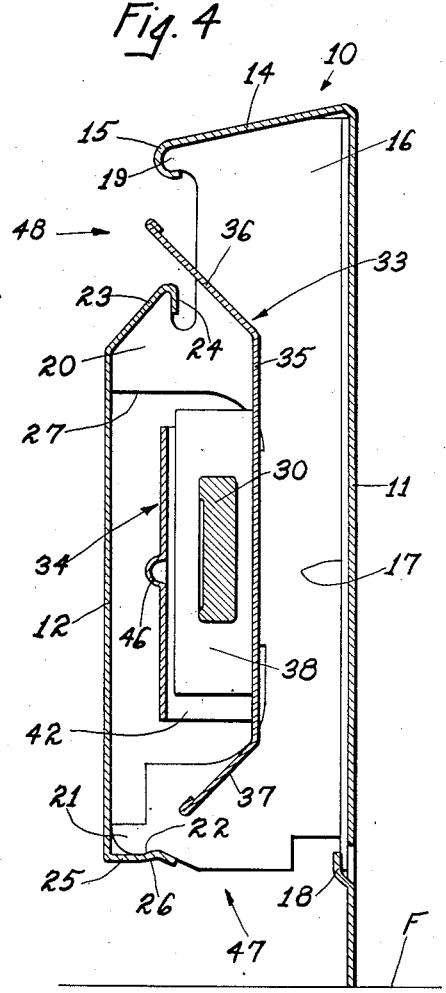
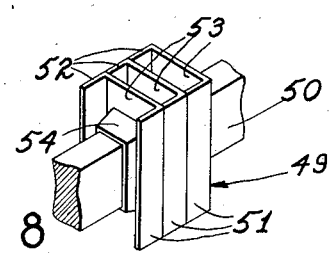
INVENTOR.
ERNEST N. CALHOUN
BY
ATTORNEY

United States Patent Office 2,899,529
Patented Aug. 11, 1959

2,899,529

ELECTRIC HEATING APPARATUS

Ernest N. Calhoun, Pittsburgh, Pa., assignor to Edwin L. Wiegand Company, Pittsburgh, Pa., a corporation of Pennsylvania Application October 18, 1955, Serial No. 541,191

9 Claims. (Cl. 219—34)

This invention relates to electric heating apparatus, more particularly to apparatus of the type for baseboard heating in dwellings, and the principal object of this invention is to provide new and improved apparatus of this type.

In baseboard heating, it is customary to secure a suitable casing at or near the baseboard region of a dwelling, the casing including suitable mounting means for an electric heater. The casing and supporting means are preferably formed of metal and although such material facilitates production it also acts as a good conductor of heat. In prior art constructions, heat conduction was a serious problem in that it presented a fire hazard unless the casing was suitably heat-insulated from adjoining portions of the dwelling. On the other hand, adequate heat insulation increased the cost of the apparatus and made it compare unfavorably with the cost of other types of heating apparatus.

This invention provides a heating apparatus especially suitable for baseboard type heating and incorporates construction which eliminates, or largely minimizes, the requirement for heat insulation. Further, the apparatus of the present invention may be manufactured for knockdown shipment and may be easily assembled at the site without the necessity of any special tools or apparatus.

In the drawings accompanying this specification and forming part of this application, there are shown, for purpose of illustration, embodiments which the invention may assume, and in these drawings:

Figure 1 is a perspective view of heating apparatus incorporating the invention, Figure 2 is a fragmentary, front elevational view of the apparatus shown in Figure 1, Figure 3 is a broken sectional view corresponding generally to the line 3—3 of Figure 2, Figure 4 is an enlarged sectional view corresponding generally to the line 4—4 of Figure 2, Figures 5 and 6 are fragmentary perspective views of parts used in the improved heating apparatus, Figure 7 is a perspective view of another part used in the heater assembly, and Figure 8 is a fragmentary perspective view of a modified construction.

The embodiment of the invention disclosed in Figures 1 through 7 is incorporated in heating apparatus of the baseboard heater type. As is customary in baseboard heating, the heater 10 is disposed adjacent to the floor of the dwelling and may extend around the room or only along a portion of the wall of the room.

The heater herein disclosed comprises a casing formed of an elongated back plate 11 and an elongated front plate 12 spaced from the plate 11. The back plate may be secured to the lower wall surface in any suitable manner and preferably is secured substantially flat against such surface. As herein shown, the back plate 11 has an integral, co-extensive top portion 14 which is inclined downwardly from the plate 11 and terminates in a rolled lip 15.

As seen in Figure 3, a pair of transversely extending support members 16—16 is provided to maintain the spacing between plates 11 and 12. The members may be formed as identical stampings and formed right and left hand, as herein shown, or they may be formed of the same hand and used in appropriate manner.

As best seen in Figures 4 and 7, each support member 16 is generally flat and provided with a vertically extending angle portion 17 which may lie against the back plate 11. In some instances, it is desirable to pass fastening screws through aligned holes in the angle portion 17 and back plate 11 and thread such screws into the wall.

In any event, it is desirable to fit the lowermost portion of each angle portion into a longitudinaly extending, upwardly opening lip 18 struck out from the back plate 11 and to fit an upper necked portion 19 of each member into the rolled lip 15, whereby each support member 16 may be easily assembled with the back plate without use of fastening members and tools and whereby each member may be adjusted longitudinally of the back plate 11. It will be clear that the top portion 14 will spring sufficiently to enable interengagement of parts 15 and 19.

Each support member 16 is provided with an inclined apex-forming portion 20 and a lower foot portion 21 which has an upwardly inclined lower edge surface 22. The front plate 12 is formed at its upper part with an inclined wall portion 23 terminating in a hook portion 24. The wall 23 fits generally flush with the incline of the portion 20 and the hook 24 engages with the apex formed by the portion 20.

At its lower end, the front plate 12 has a transversely bent flange 25 terminating in an upwardly inclined portion 26 which forms a spring clip and has a snap fit with the edge surface 22. Thus, the front plate 12 may be easily assembled with the support members 16 by engaging the hook portion 24 over the apex portion 20 of each member and therefter pushing inwardly on the lower portion of the front plate to snap the inclined portion 26 thereof to engaged relation with respective edge surfaces 22.

Each support member is formed with a relatively large notch 27 for clearance purposes, part of the material struck out to form the notch being bent to provide a support leg 28 preferably formed with an oblong aperture 29.

From the foregoing, it will thus be seen that once the back plate 11 is properly positioned on the wall, the remainder of the casing assembly may be made without use of fastening screws or tools and that the front plate 12 may be easily assembled and disassembled at will.

With the front plate 12 removed, access is provided to permit assembly, disassembly or adjustment of the heater portion of the apparatus. The electric heater is preferably of the strip heater type, as shown at 30, and such type of heater usually comprises a metal sheath, oblong in cross section. Within the sheath is disposed a resistor conductor 31 and electric-insulating heat-conducting material (not shown), the latter usually being of some suitable granular refractory material.

The usual strip heater has its ends devoid of resistor conductor and refractory material and such ends are pressed to close the opposite open ends of the sheath and to form oblong mounting tabs 32—32. The strip heater may have terminals at its opposite ends or such terminals may be located at one end only. As shown in Figure 3, the terminals are located at one end only of the strip heater and it will be noted that the resistor conductor 31 is spaced well inwardly of each end of the heater so that the mounting tabs 32—32 are not heated to as great an extent as is the intermediate body of the heater. This is usual heater construction and further description is believed to be unnecessary, except to emphasize that the mounting tabs 32—32 are relatively cool during energization of the heater.

Baffle means are provided to direct air flow and to more efficiently effect heat transference from the heater to the air flowing through the heater casing 10. A relatively wide rear baffle 33 and a narrower front baffle 34 are used in the present embodiment.

The rear baffle comprises a generally flat body portion 35 having forwardly inclined upper and lower wings 36 and 37. As best seen in Figures 3 and 6, the opposite ends of the rear baffle are bent transversely to form supporting tabs 38, each tab being provided with an oblong opening 39. In the case where the rear baffle is of considerable length, additional tabs 40 may be spot-welded to the body portion 35 of the rear baffle, and such additional tabs are provided with oblong openings 41 aligned with the openings 39.

Referring principally to Figures 3 and 5, the front baffle has its opposite ends bent transversely to form supporting tabs 42, each of which is provided with an oblong opening 43. Again, if the rear baffle is of considerable length, additional supporting tabs 44 may be spot-welded in position, each additional tab having an oblong opening 45 aligned with the openings 43. Since the front baffle 34 in this instance is not formed with inclined wings, such as wings 36, 37 of rear baffle 33, a longitudinally extending bead 46 may be formed in the front baffle 34 for stiffening purposes.

The openings 39, 41, 43 and 45 of the supporting tabs on the rear and front baffles are preferably just slightly larger than cross-sectional outline of the body portion of the strip heater so that the latter may be easily threaded through aligned openings, support the baffles in hanging relation, and restrain the baffles against turning on the body of the heater. The supporting tabs will have interengagement with the body of the heater to provide for conduction of heat from the heater to the baffle. To increase conduction, each supporting tab may have a flange margining its opening to provide more surface contact with the strip heater.

To assemble the front and rear baffles on the strip heater, it is merely necessary to dispose such baffles in properly spaced relation with all the openings in the supporting tabs in generally aligned relation, and then thread the strip heater through such openings. The heater assembly may then be easily assembled with the casing by inserting one mounting tab 32 of the heater sufficiently through the opening 29 in one support member 16 to clear the opposite mounting tab for insertion through the opening 29 in the other support member 16. The strip heater may then be adjusted so that its mounting tabs 32 are generally equally inserted through respective openings 29. The openings 29 are preferably of a size to just clear the mounting tabs 32 so that the heater assembly is restrained against a rotational movement. It will be obvious that the entire assembly provides sliding and yielding interfitting connections so that the parts may expand and contract without the annoying noise inherent in the prior art heaters.

From the foregoing description, it will be appreciated that the front and rear baffles may be easily and quickly assembled with or disassembled from the strip heater, and that the heater assembly may also be attached to or detached from the casing without the use of fastening elements, such as screws or bolts, and without the use of tools.

Instead of forming the front and rear baffles of a length generally co-extensive with the body of the heater, it may be preferred to form such baffles in short lengths and use one or more lengths of baffles, depending upon the length of the heater body portion.

As before mentioned, the casing and baffles are usually made of sheet metal to facilitate mass production by the stamping process. Heretofore, the baffles were in some manner directly supported by the casing with the result that heat was conducted from the baffles to the casing and from the casing to the wall, if the latter two were not suitably heat insulated. This not only lowered efficiency of the heating apparatus, but also increased the fire hazard, or increased cost by reason of the use of heat insulation.

The invention herein disclosed minimizes loss by heat conduction to the casing and the wall and, therefore, minimizes fire hazards, by reason of the fact that the only connection between the heater (and the baffles hung thereon) and the casing is through the relatively cold ends of the strip heater.

Referring to Figure 4, with the strip heater energized, cold air will be drawn upwardly from the floor F and pass through the elongated opening 47 at the bottom of the casing 10, such entering air being directed by the lower wing 37 of the rear baffle to pass both forwardly and rearwardly of the strip heater, in wiping engagement with the strip heater and the baffles to pick up heat. The heated air is permitted to escape from the casing 10 to the room to be heated through the elongated opening 48 at the upper end of the casing.

Reference was previously made to the provision of a flange margining the opening of the baffle supporting tab to increase conduction of heat from the strip heater to the baffle and, in the embodiment of the invention shown in Figure 8, a flange of this type is provided. As therein shown, a plurality of preferably identical baffles 49 are threaded on the strip heater 50. Each baffle is preferably formed of sheet metal and is of generally channel shape. The flanges 51 and 52 of the baffles respectively combine to form the front and rear baffles, and the web 53 of each baffle is provided with a protruding flange 54 providing an opening for closely receiving the strip heater. It is to be understood that the term "baffle" as used in this description and in the claims is intended to include air directing means as well as means providing extended heat transfer surface.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A baseboard type heater assembly, comprising elongated front and back panels, said back panel having a longitudinally extending upwardly opening groove at its lower portion and a wall overhanging its upper portion and terminating in a rolled lip, a pair of spaced support members for holding said front and back panels in assembled and spaced relation, each support member extending transversely between said panels and having a portion seating in said groove and a spaced portion seating in said rolled lip to assemble said support members in longitudinally adjustable relation with said back panel, each of said support members also having an inclined lower surface and an apex-forming upper surface, said front panel having a hook portion engaging over said apex portion and a spring catch portion having latching engagement with said inclined surface, each of said support members having an apertured supporting tab, a strip heater having its opposite ends slidably supported by marginal surfaces defining the aperture in said supporting tabs, and baffle means supported in dependent manner on said strip heater.

2. A heater assembly, comprising an elongated heater, a support for said heater, and baffle means for directing flow of fluid relative to said heater, said baffle means comprising a plate-like member transversely spaced from and coextensive with at least a part of said heater, said plate-like member having a transversely extending portion apertured to slidably receive said heater, whereby said plate member may be slid longitudinally along said heater.

3. A heater assembly, comprising an elongated heater having at least a portion thereof non-circular in cross-section, a support for said heater, and baffle means for directing flow of fluid relative to said heater, said baffle means comprising a plate-like member transversely spaced from and coextensive with at least a part of said heater, said plate-like member having a transversely extending portion apertured to slidably receive said heater and to fit in non-rotative relation with the non-circular portion thereof.

4. A heater assembly, comprising an elongated heater having an intermediate active heating portion and non-heating end portions, a support engaging the end portions of said heater, and baffle means for directing flow of fluid relative to said heater, said baffle means comprising a plate-like member transversely spaced from and coextensive with at least a part of said heater, said plate-like member having spaced transversely extending portions each apertured to slidably receive said heater and thereby support said baffle means from said heater.

5. A heater assembly, comprising a strip heater having an intermediate active heating portion and non-heating end portions, a support engaging the end portions of said heater, and baffle means for directing flow of fluid relative to said heater, said baffle means comprising a plate-like member transversely spaced from and coextensive with at least a part of said heater, said plate-like member having spaced transversely extending portions, each apertured complementary to the cross-sectional outline of said heater to slidably receive said heater and thereby support said baffle means from said heater and provide for sliding movement of said baffle means longitudinally along said heater.

6. A base board heater, comprising a back plate adapted to be secured to the baseboard section of a room, a front plate spaced from said back plate, a pair of transverse plates between said back and front plates, each transverse plate having detachable resilient connection with said back plate and said front plate having detachable resilient connection with each of said transverse plates, each of said transverse plates having an angular tab portion disposed in the space between said back and front plates, said tab portions being in facing relation and each having a slot-like aperture formed therein, a strip heater of a length greater than the spacing between said tab portions and having opposite end portions of a transverse configuration complementary and of a size to slidably pass through respective ones of said slot-like apertures, said heater being assembled by moving it in a longitudinal direction to pass one end portion through one tab portion aperture a sufficient distance to clear the opposite end portion with respect to the other tab portion and thereafter moving the heater in the opposite longitudinal direction to pass said opposite end portion through the slot-like aperture in said other tab portion a distance sufficient to pass through the latter without disengaging said first end portion, whereby opposite ends of said strip heater are slidably supported on and loosely confined against displacement by marginal surfaces of the apertures in respective tab portions to thereby provide for free expansion and contraction of said strip heater and whereby the latter is held against rotation about its longitudinal axis.

7. The construction according to claim 6 and further including baffle means carried by said strip heater and comprising a plate-like member transversely spaced from and coextensive with at least a part of said heater, said plate-like member having spaced transversely extending portions each having a slot-like opening complementary to the transverse configuration of said heater and slidably receiving said heater, whereby said baffle means is supported by said heater and held against rotation relative thereto.

8. A baseboard heater, comprising a back plate adapted to be secured to the baseboard section of a room, a front plate spaced from said back plate, a pair of transverse plates between said back and front plates, each transverse plate having detachable resilient connection with said back plate and said front plate having detachable resilient connection with each of said transverse plates, each of said transverse plates having an angular tab portion disposed in the space between said back and front plates, said tab portions being in facing relation and each having a slot-like opening therein, a strip heater of a length greater than the spacing between said tab portions and having opposite end portions of a transverse configuration complementary and of a size to slidably pass through respective ones of said slot-like openings, said heater being assembled by moving it in a longitudinal direction to pass one portion through one tab portion opening a sufficient distance to clear the opposite end portion with respect to the other tab portion and thereafter moving said heater in the opposite longitudinal direction to pass said opposite end portion through the slot-like opening in said other tab portion a distance sufficient to pass through the latter without disengaging said first end portion, whereby said heater is slidably supported at its opposite ends for free expansion and contraction and is held against rotation about its longitudinal axis, baffle means carried by said strip heater and comprising a plate-like member transversely spaced from and coextensive with at least a part of said heater, said plate-like member having spaced transversely extending portions each having a slot-like opening complementary to the transverse configuration of said heater and slidably receiving said heater, whereby said baffle means is supported by said heater and held against rotation relative thereto.

9. A baseboard heater, comprising a back housing member adapted to be secured to the baseboard section of a room, a pair of spaced plates carried by and extending transversely in facing relation from said back housing member, each of said plates having a rectangular aperture formed therein and said apertures being aligned, and a sheathed strip heater having an intermediate heating portion and non-heating end portions, each of said end portions being formed to rectangular cross-sectional shape to slidably fit in complementary manner within an aperture in a respective one of said plates, said strip heater being of a length greater than the spacing between said plates and assembled with the latter by moving it lengthwise in one direction to pass one end portion through the aperture of one plate a sufficient distance to clear the opposite end portion with respect to the other plate and thereafter moving said strip heater lengthwise in the opposite direction to pass said opposite end portion through the aperture of said other plate a distance sufficient to pass through the last mentioned aperture without removing said one end portion from its aperture, whereby opposite non-heating end portions of said strip heater are slidably supported and loosely confined against displacement and rotation by marginal surfaces of the apertures in respective of said plates to thereby provide for free expansion and contraction of said strip heater.

(References on following page)

References Cited in the file of this patent

UNITED STATES PATENTS

| | | | |
|---|---|---|---|
| 1,475,162 | Abbott | Nov. 27, 1923 |
| 1,521,880 | Guarino | Jan. 6, 1925 |
| 1,673,370 | Murray | June 12, 1928 |
| 1,960,955 | Recker | May 29, 1934 |
| 2,080,800 | Wiegand | May 18, 1937 |
| 2,450,921 | Smith | Oct. 12, 1948 |
| 2,525,850 | Andersen | Oct. 17, 1950 |
| 2,627,014 | Kolb | Jan. 27, 1953 |
| 2,654,017 | Hicks | Sept. 29, 1953 |
| 2,683,209 | Beckjord | July 6, 1954 |
| 2,733,049 | Carter | Jan. 31, 1956 |
| 2,815,431 | Paley | Dec. 3, 1957 |

FOREIGN PATENTS

| | | |
|---|---|---|
| 404,784 | Great Britain | Jan. 25, 1934 |
| 251,324 | Switzerland | Aug. 2, 1948 |
| 629,253 | Great Britain | Sept. 15, 1949 |